United States Patent
Ehrensvard et al.

(10) Patent No.: US 7,772,974 B2
(45) Date of Patent: Aug. 10, 2010

(54) TAMPER EVIDENT SEAL SYSTEM AND METHOD

(75) Inventors: Jakob Ehrensvard, Stockholm (SE); Fredrik Einberg, Huddige (SE)

(73) Assignee: Cypak AB, Stockholm (SE)

( * ) Notice: Subject to any disclaimer, the term of this patent is extended or adjusted under 35 U.S.C. 154(b) by 911 days.

(21) Appl. No.: 11/307,891

(22) Filed: Feb. 27, 2006

(65) Prior Publication Data

US 2006/0195705 A1 Aug. 31, 2006

Related U.S. Application Data

(60) Provisional application No. 60/593,961, filed on Feb. 28, 2005.

(51) Int. Cl.
*G08B 13/14* (2006.01)
(52) U.S. Cl. ............. 340/572.1; 340/652; 340/541; 340/550; 340/590
(58) Field of Classification Search ........... 340/572.1, 340/652, 541, 550, 657, 635, 590, 545.5; 713/194; 726/34; 361/760, 752; 174/261, 174/250
See application file for complete search history.

(56) References Cited

U.S. PATENT DOCUMENTS

| 5,332,315 | A | * | 7/1994 | Baker et al. ............... 374/102 |
| 5,353,350 | A | * | 10/1994 | Unsworth et al. .......... 713/194 |
| 6,480,110 | B2 | * | 11/2002 | Lee et al. ................. 340/572.5 |
| 6,982,642 | B1 | * | 1/2006 | Cesana et al. ............. 340/550 |
| 7,015,823 | B1 | * | 3/2006 | Gillen et al. ............... 340/652 |
| 7,054,162 | B2 | * | 5/2006 | Benson et al. ............. 361/760 |
| 7,064,412 | B2 | * | 6/2006 | Geissinger et al. ......... 257/535 |
| 7,323,977 | B2 | * | 1/2008 | Kodukula et al. .......... 340/505 |
| 7,486,192 | B2 | * | 2/2009 | Yamagajo et al. ........ 340/572.7 |
| 2003/0009683 | A1 | * | 1/2003 | Schwenck et al. ......... 713/194 |
| 2004/0113792 | A1 | * | 6/2004 | Ireland et al. ............ 340/572.8 |
| 2004/0195001 | A1 | * | 10/2004 | Farquhar et al. ............ 174/261 |
| 2005/0116327 | A1 | * | 6/2005 | Danno et al. ............... 257/678 |
| 2006/0255953 | A1 | * | 11/2006 | Lyon et al. ............... 340/572.8 |

FOREIGN PATENT DOCUMENTS

| WO | WO-02/077939 | 10/2002 |
| WO | WO-2004/078787 | 9/2004 |

* cited by examiner

*Primary Examiner*—Davetta W Goins
*Assistant Examiner*—Hoi C Lau
(74) *Attorney, Agent, or Firm*—Connolly Bove Lodge & Hutz LLP; Arlene P. Neal (57) ABSTRACT

A tape seal includes electronic circuitry to detect tamper- and manipulation events relating to sealed items in various embodiments. A complex impedance is formed in a continuous seal. The seal is designed in such a way, that any attempt to break or remove the seal results in a change of the complex impedance. An electronic module in connection with the seal quantifies a complex impedance, and when a change is detected above a programmed threshold, this is treated as a tamper event. In one embodiment, the inclusion of reference impedances are applied to allow a more precise detection of a tamper event and allow for automatic calibration of natural variations of the complex impedance. In a further embodiment, a method of determining tampering with a sealed item is disclosed.

7 Claims, 10 Drawing Sheets

TAMPER EVIDENT SEAL SYSTEM AND METHOD

CROSS REFERENCE TO RELATED APPLICATIONS

This Application claims the benefit under 35 U.S.C. §119 (e) of U.S. Provisional Application 60/593,961 filed on Feb. 28, 2005, the entire contents of which are incorporated herein by reference. This application is also related to co-pending International Application PCT/SE2005/000230, the entire contents of which are incorporated herein by reference.

BACKGROUND

Transport of goods is becoming more and more automated. Automatic scanning of products is resulting in information being transferred over world-wide networks. But verifying the product's integrity and authenticity is still often subject to manual steps of physical and/or optical inspection.

Sophisticated fraud, manipulation and counterfeiting of products pose a major challenge to brand owners, logistics organizations and customers, where the integrity of products and shipments are difficult to verify.

Further, there is a subjective part in verifying a product's integrity and authenticity, especially when performed remotely. If a brand owner wants to verify a product's authenticity without having access to the product physically, it has to be a certain level of trust between the parties.

A tamper evident packaging is described in WO 2004/078787, where embedded sensors can detect if the packaging has been tampered with. This conventional approach further describes methods to verify the product's authenticity in a remote scenario. However, this conventional approach is limited to applications where a fixed-sized packaging is used, since the sensors are embedded in the packaging material. In applications where the shipment is not originally packed in the tamper evident packaging and where repacking of the shipment is not feasible or practicable, this solution is of less use.

In some applications, a small label is used to seal a specific part of a product. If the product has been compromised, the seal is broken. Again, such solutions are generally limited to optical inspection only.

Recent developments in the field of Automatic Identification (AutoID) and associated services have created an increasing demand for radio frequency tags, known as RFID tags. By embedding an electronic label onto a product, the product can be identified and optional additional data stored in the label, by radio frequency interrogation. However, problems with such labels generally are that they provide limited level of confidence in terms of product authenticity, as the tags can be interrogated by anyone and the label and its contents can be counterfeited itself. Also, the tags do not provide any tamper evidence. Some solutions have been presented, where an RFID tag is applied in a way, where it is very difficult to remove it without physically destroying the tag, thereby making the tag unreadable. An unreadable tag would require manual inspection, which then in theory would make a tamper event evident. However, when there has been a tamper event it is naturally of interest to understand which identity the tampered shipment has and a system where the identity is destroyed would then require an additional identity backup system.

A different approach is disclosed in patent application WO 02/077939, where a label is prepared with a frangible conductive trace, which is designed to break if the label is damaged or an attempt has been made to remove it. However, finding the right balance between an easily broken circuit and a low risk of false alarms is somewhat difficult. Further, a detection circuit without continuous monitoring can be repaired by an opponent after a tamper event, which leaves the event undetected.

Another problem with the presently known solutions concerns the removal of even very strong and advanced adhesive labels by use of specialized solvents, in liquid- or vapour form. Combined means of heating and/or freezing, the adhesive also affect the strength of the bond and the tack of the adhesive.

It would therefore be desired to have a solution addressing the above mentioned issues and weaknesses to allow an objective verification of a product's integrity and authenticity in a remote scenario, preferably with connection to a unique product identifier. Further desirable would be to make this solution compatible with the evolving RFID infrastructure.

SUMMARY

The present disclosure describes a tape seal comprising a substrate having an integral and electrically conductive circuit arrangement and an electronic detection circuit capable of monitoring complex impedance of said conductive circuit arrangement for tamper detection and said electronic detection circuit further is connected to a radio telemetry interface to allow information to be exchanged between the tape seal and an external host computer system.

Embodiments of this disclosure are based on a sealing tape, preferably of a self-adhesive type, which is applied over an area, or plurality of adjacent areas, which need to be forced in order to void the unbroken integrity of a product. The sealing tape comprises a base substrate material, providing the mechanical support and strength of the seal. Applied on the tape are electric circuit elements, which are designed to be electrically affected when the tape is damaged or an attempt is made to remove the tape from the substrate it is mounted on.

The electronic circuit, made as an integral part of the sealing tape, is designed to monitor the complex impedance of at least one circuit element formed between the tape kernel and the adhesive, adhering to the substrate it is applied to. By modulating the characteristics of the surface energy of the tape surface and the adhesive, the electric circuit's impedance will inevitably change if the tape is tampered with.

A further embodiment is achieved by having a part of the tape, enclosing or encircling the product, to partially overlap. By having a continuous and electrically conductive core in the tape, a capacitive element is formed by the overlapping areas, thereby forming a closed AC circuit. An electronic measuring circuit which is capable of detecting an impedance as a complex sum of resistance and capacitance can then detect both if the tape itself has been damaged or if the part overlapping has been compromised. The tape can be applied on the product in such a way that the only way to void the product's integrity is to remove, or at least significantly affect the overlapping area. Where the first embodiment in theory could be compromised by removing the tape from the surface by sophisticated means, in the present embodiment the seal cannot be tampered with without affecting the electric characteristics of the circuit.

Another embodiment of this disclosure is a tape including more than one continuous part and where each subpart having areas that partially overlap, thereby forming a continuous complex impedance circuit.

In another embodiment of this disclosure, the substrate itself can be used as a dielectric in a capacitive element, where two adhesive tape labels can be applied, on each side of the substrate. The first label contains the electronic detection circuit and a resistively broken circuit, extending over the area of the label. The second label has a circuit element, which, when the label is mounted on the opposing side of the first label, forms a closed AC circuit. In another embodiment the second label is omitted, and instead a patter is formed by an electrical conductive ink, which is absorbed by the substrate. When the [first] label is mounted over the pattern [of the second label], a closed AC circuit is formed. It would be extremely difficult to remove the [first or second] label, without affecting the detected complex impedance. By further making each capacitive surface frangible as described in the first embodiment, the probability of managing to recreate a tampered circuit is made very small.

It should be obvious that combinations of the embodiments described above can yield benefits in order to make tamper events even more difficult to circumvent by a sophisticated opponent.

In order to electronically interrogate a seal, the electronic detection circuit can be made to include radio telemetry means. By using a standardized Radio Frequency Identification (RFID) interface, the seal can be scanned using off-the-shelf equipment and further be made compatible with infrastructure being built as part of evolving RFID track-and-trace systems. When used in a standard ISO1 5693 or ISO1 8000-6/EPC Generation 2 environment, the tamper monitoring "active" tags will then act and reply with pre-programmed static data as ordinary passive tags in order to be fully compatible with existing middleware. To retrieve data about tamper events, an extended data area needs to be accessed, typically not as a part of the standard procedure. In order to quickly signal that a specific monitored shipments needs attention, the active tag can then modify its static data to alert the scanning station.

Apart from the RFID interface, the electronic circuit can comprise an encryption processor and a set of pre-stored keys, which will enable the tape to be used to authenticate the product itself and any associated data stored in the electronic circuit. The encryption processor and pre-stored keys enables cryptographic processes involving stored data to take place in the tape itself, thereby eliminating all risks of manipulating data or unauthorised reading of data.

A more detailed scheme is described in PCT/SE2005/000230, the entire contents of which are incorporated herein by reference.

In another embodiment, a method for detecting tampering with a sealed item includes placing the sealed item in proximity to device comprising an RFID scanner; transmitting a unique identity to a host from the device; retrieving an appropriate cryptographic key from a host database to be used for secure operations with the device; challenging the device by the host; transmitting encrypted data from the device to the host; and receiving and decrypting the encrypted data in the host, wherein the device transmits encrypted data to the host in a chain-blocked-cipher (CBC) mode.

DETAILED DESCRIPTION

The detection principle of the tape according to various aspects of this disclosure relies on detecting a change of complex impedance of a circuit arrangement formed by applying a series of electrically conductive circuit elements of electrically conductive ink on a substrate film. The conductive circuit elements may include a resistive part in series with a capacitive part. In reality, the circuit arrangement will comprise a sum of resistances and capacitances, both in series and in parallel. The resulting equation can therefore be simplified as: $Z=R+Xc$, where $Xc=1/\omega C$.

The circuit is designed in such a way, that any tamper event would inevitably create a significant change in Z, which can be detected by an electronic module, which is arranged to be in electric contact with the circuit element or circuit elements.

The resistive part, R, is measured by applying a constant voltage over the circuit, where the current is measured. The circuit DC resistance is then resolved using Ohm's law, where $R=U/I$.

The reactive part, Xc, is measured by applying an AC signal with a known frequency, where $f=2\pi\omega$. The AC impedance is then resolved as $Z=\frac{1}{2}\pi C$. Alternatively a step may be applied, and the response can be analysed to solve for C.

Figure 1:
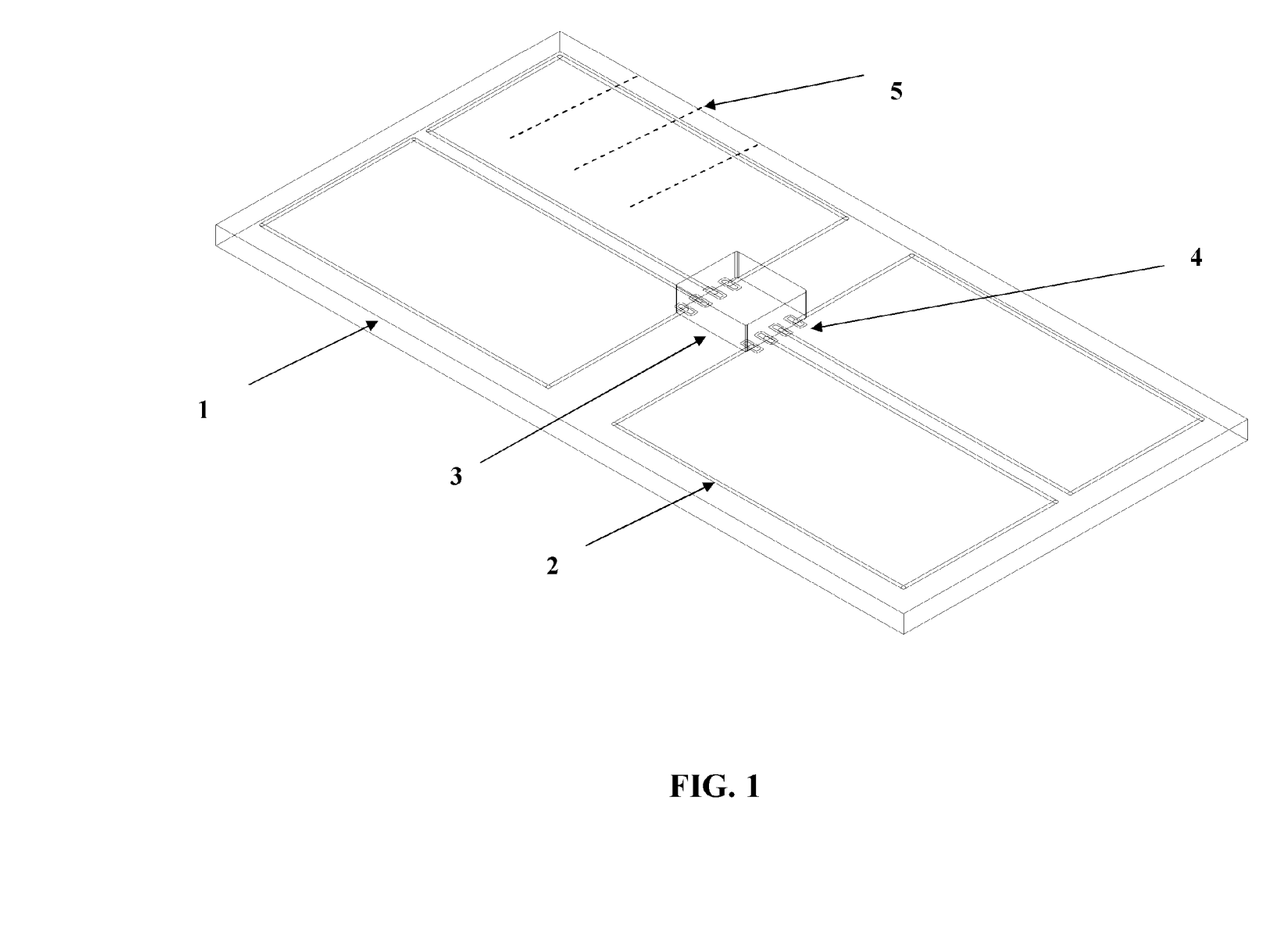
FIG. 1 illustrates a circuit layout of an embodiment.

Basic Circuit Description:

In one embodiment and with reference to FIG. 1, a tape seal comprising a polymer or paper film, or a combination of polymer and paper (1) is overprinted with electrically conductive circuit lines (2). On top of the film, an electronic module (3) is applied, having its sensing inputs connected to the circuit lines (2), using electrically conductive adhesive (not shown). The adhesive electrically interconnects pads (4) on the electronic module (3) with corresponding pads terminating the circuit lines (2). The polymer film or laminate (1) may be cut with recesses (5), which are designed to make the film more frangible and therefore more susceptible to be damaged if an attempt is made to remove the tape, thereby damaging the conductive circuit lines (2), at least partially. The electronic module (3) can further contain data communication means (not shown), to allow information to be exchanged between the module and an external host computer system.

In an aspect of this embodiment, the polyester film and the circuit lines can be overprinted with an adhesive film, allowing the tape seal 1 to be mounted upside down onto a product. The adhesive is selected to give strong adhesion between the film and the substrate, which makes it difficult to remove the tape without damaging the circuit lines. Together with the recesses described above, a tamper event can be easily detected by a change in resistance in the circuit lines.

By selection of surface characteristics of the polyester film, the adhesive can be designed to adhere stronger to the circuit lines than the polyester film substrate. When the tape is removed, the circuit lines will then inevitably be at least partially damaged.

The seal can be designed into virtually any form factor, including a long strip, intended to fully enclose a packaging or like a label to be applied on a selected area of a package. When applied, one end can also overlap the other end.

The electronic module comprises a sensor or sensing means designed to detect a change in resistance R of the circuit lines. A change above a pre-defined threshold is considered to be a tamper event. An attempt to bypass a circuit line by introducing a short-circuit, would also create a change in the resulting resistance, which will also be detected and recorded as a tamper event. Further, any attempt to restore conductivity of a tampered circuit line will be very difficult, as the pre-defined stored nominal resistance of the circuit line is not known by an opponent.

The circuit lines are implemented as continuous traces printed with electrically conductive ink, where the ink should have a fairly high intrinsic resistance to make the circuit lines sensitive to a small relative change as a result of a tamper event. Due to differences in manufacturing, the absolute nominal resistance R of each circuit line will vary. Further, as a result of aging and temperature fluctuations, the absolute resistance will change considerably over time. By implementing an integrating detecting circuit, slow changes of R can be filtered out. In addition, instead of checking a relative change on a per-circuit basis, aging can be considered to affect all circuits fairly evenly. By constantly calculating a relative change affecting all circuit lines over an extended period, these errors can be cancelled out.

More precisely, a simple algorithm involves calculation of each circuit line's relative change from its nominal value. A mean value of all relative change can then be subtracted from the calculated relative change, giving a more accurate indication of a suspected tamper event.

The selection of ink can add additional advantages with tamper events involving powerful organic solvents. Having an ink, or a combination of inks, including over- or under-printing with a non-conductive ink, each being soluble in different solvents, a tamper event involving solvents will then introduce a significant change of the resistance of a circuit line that has been at least partially dissolved in the solvent used. The inclusion of layers of a non-conductive ink will cause the traces of conductive inks to be mixed with the non-conductive ink, thereby yielding a higher resistance when the solvent has evaporated.

The embodiment described above relies on the fact that at least one of a plurality of circuit lines gets at least partially damaged in order to detect a tamper attempt. This will also be the case if an opponent having access to advanced means to carefully manipulate the adhesion characteristics of the adhesive. Most adhesives loose their tack when cooled down to a sufficiently low temperature, which fairly easily can be done with liquid nitrogen, bottled carbon dioxide gas and other commercially available freezing agents.

For some applications, the dimensions of a tamper evident tape seal must be flexible to allow packages of different sizes to be sealed.

Figure 2:
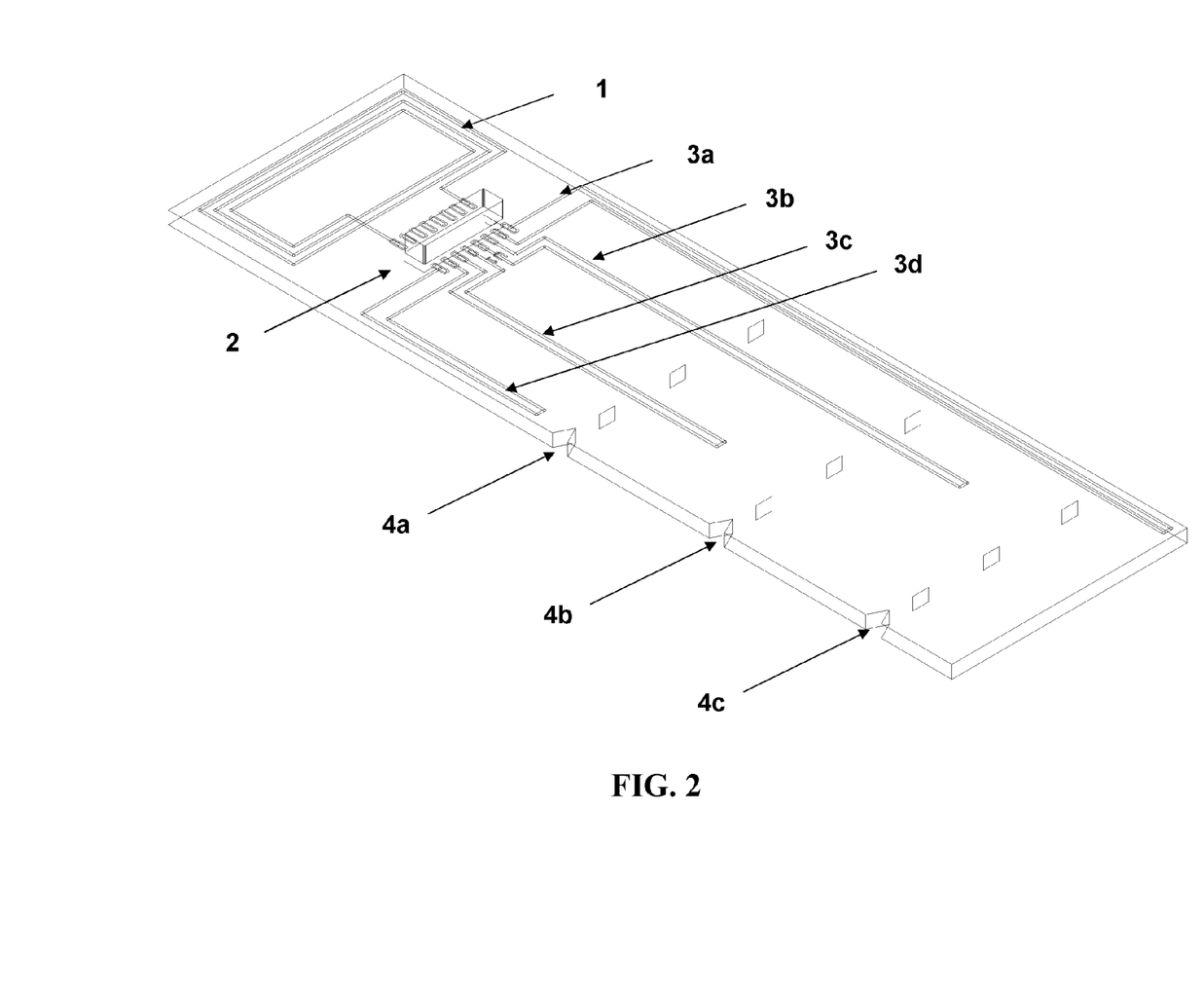
FIG. 2 illustrates a tamper evident seal of an embodiment.

FIG. 2 describes a tamper evident tape seal, having a plurality of circuit lines $3a$, $3b$, $3c$ and $3d$ extending over different lengths of the seal. Markers, or cut-outs, in the seal ($4a$, $4b$ and $4c$), indicates where the seal can be cut, prior to applying the seal onto the item that is to be sealed and monitored. A processing unit (2) features a radio-telemetry antenna (1) for communication with a host computer. The processing unit (2) has impedance measurement means to monitor the impedance of sensing lines ($3a$, $3b$, $3c$ and $3d$).

When the seal is properly applied to the item being sealed, an arming command is sent to the processing unit (2) via the radio-telemetry antenna (1) from a host computer (not shown). The processing unit (2) then measures the impedance of all circuit lines ($3a$, $3b$, $3c$ and $3d$), where the nominal impedance values are stored in a non-volatile memory of the processing unit. The processing module can then report back to the host computer system which lines are intact, which should correspond to where the seal was cut off.

Any change in the remaining circuit occurring after the seal was armed can then be regarded as a tamper event and will be stored in the electronic module.

The circuit above may include at least one additional reference circuit line, which is not cut to allow the processing unit to compensate for aging effects as described earlier.

Further, by having a plurality of circuit lines, it will be possible to monitor where on the seal a tamper event has occurred.

In order to avoid interference between the circuit lines (3) and the radio-telemetry antenna (1), the circuit lines (3) should have high resistance and RF impedance. The circuit lines, which are formed as loops, would otherwise inevitably be resonant at higher frequencies, causing interference problems and give possible false readings when present in radio frequency fields.

By having an overlap of two parts of a seal, encircling a product, a capacitive element can be formed between the two parts each comprising circuit lines. Due to the nature of a capacitor, the capacitance between two patches will inevitably change depending on the distance of the parts to each other. It therefore follows, that an attempt to break the seal, including removing the seal by dissolving the adhesive, must involve breaking up a closed capacitive (AC) circuit.

Figure 3A:
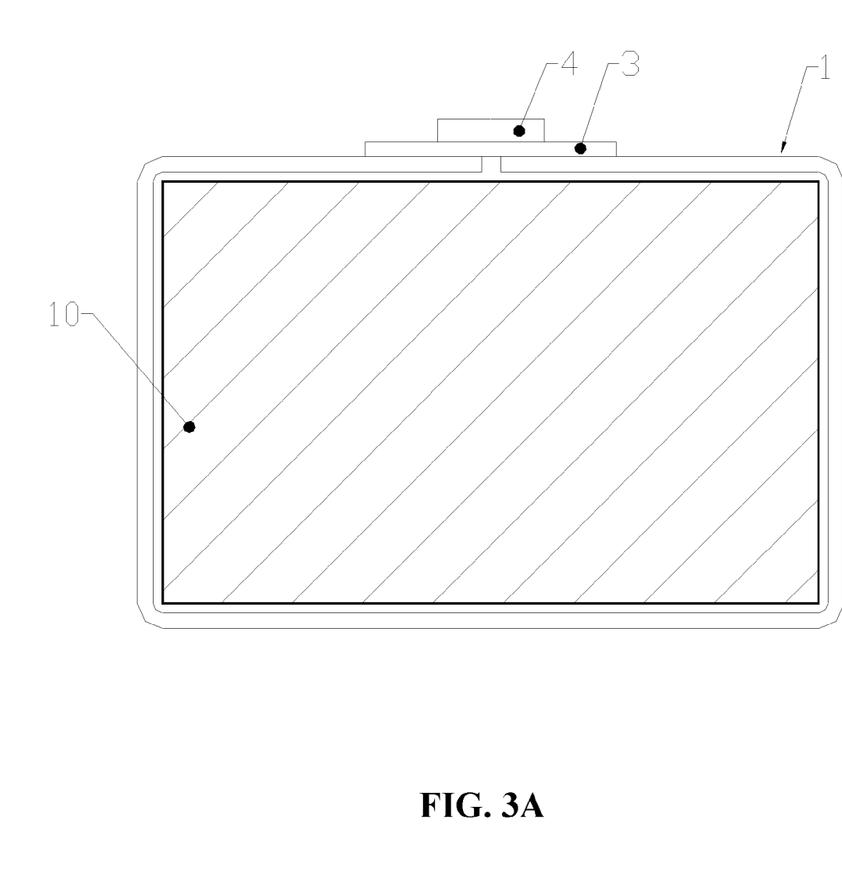
FIG. 3A depicts a continuous electrically conductive tape enclosing an item.
Figure 3B:
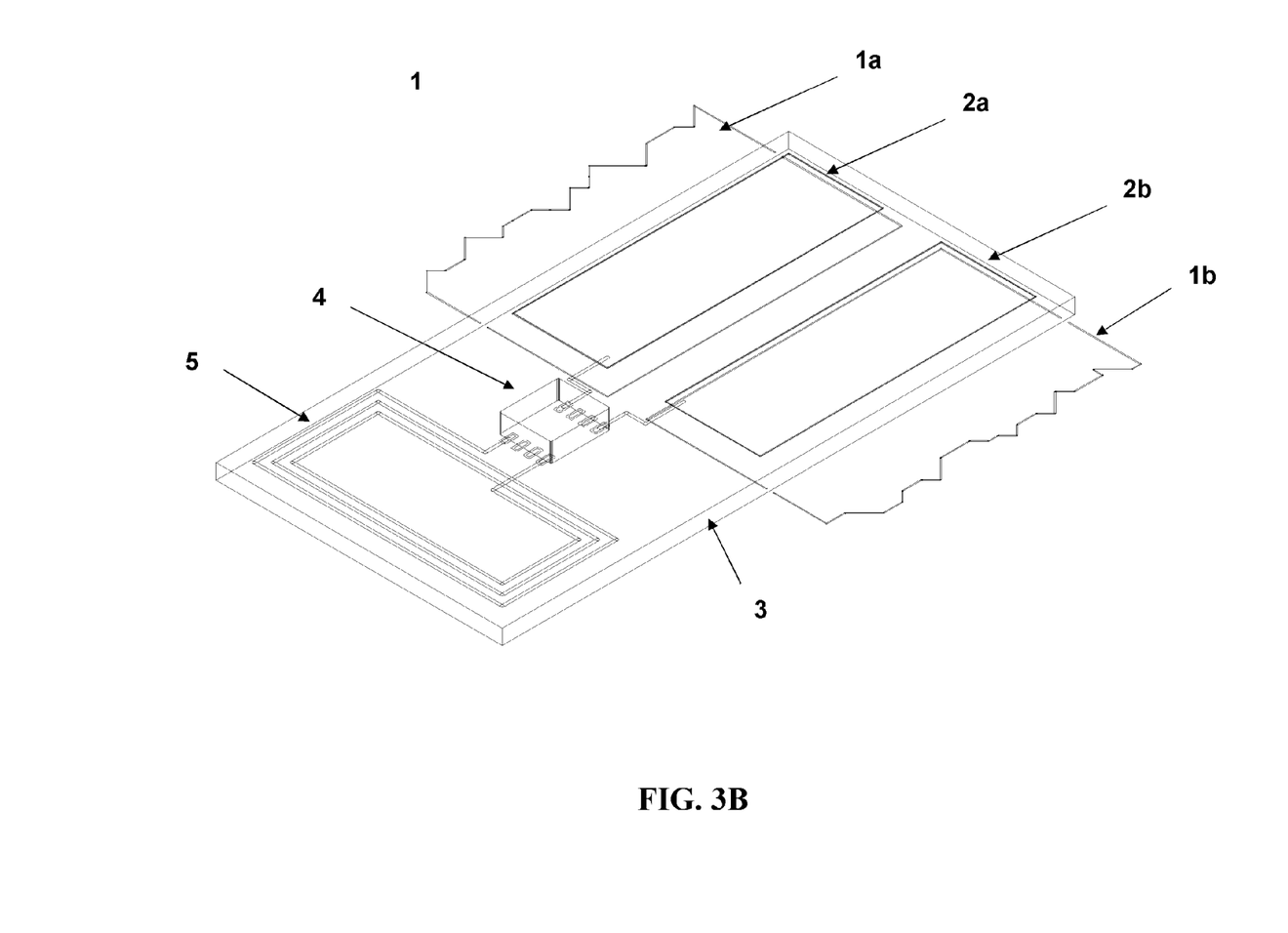
FIG. 3B depicts the continuous electrically conductive tape in a perspective view.

In FIGS. 3A and 3B, a continuous electrically conductive film (1) encloses an item (10), where each end of the film ($1a$ and $1b$) attaches to an electronic module (3) via two capacitive patches ($2a$ and $2b$). The electronic module (3) further comprises a processing unit (4) connected to a radio telemetry antenna (5).

Figure 3C:
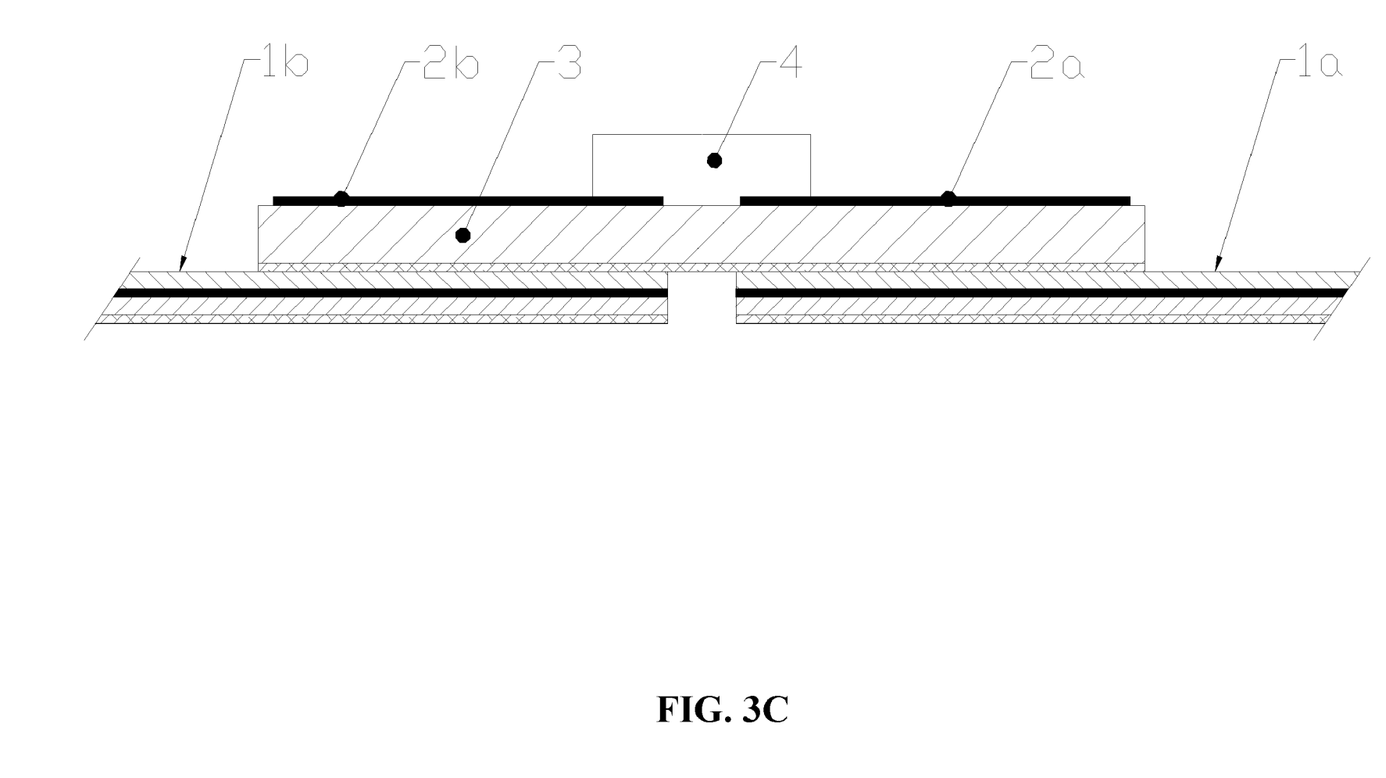
FIG. 3C depicts the continuous electrically conductive tape in an elevation view.

FIG. 3C shows the film (1) made as a laminate, where the kernel of the film is made to be electrically conductive.

Tamper monitoring is performed by the processing unit (4), emitting an AC signal on patch $2a$. An AC current is coupled via the capacitor formed between the patch $2a$ and the electrically conductive film (1) at $1a$, where the insulator (3) will act as a dielectric. The AC current flows through the conductive film (1) and couples through a second capacitor formed at patch $2b$ at $1b$ and is detected by the processing unit (4).

Figure 4:
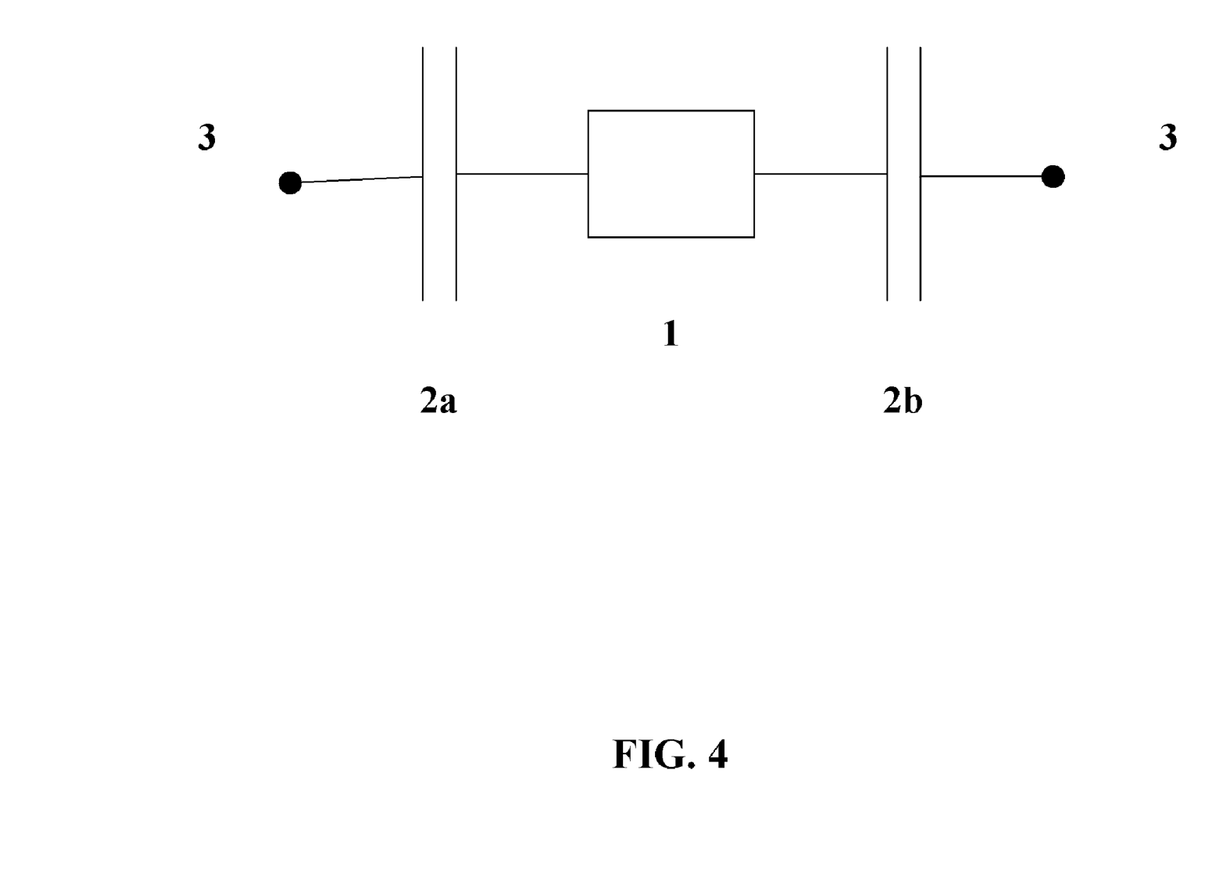
FIG. 4 provides an equivalent impedance circuit of an embodiment of the tamper evident seal.

The resulting AC impedance can be simplified as $Z=R_1+X_{2a}+X_{2b}$, where $R_1$ is the resistance of the conductive film and $X_{2a}$ and $X_{2b}$ are the effective reactance of the capacitors formed at $2a$ and $2b$ respectively.

If the AC circuit is tampered with, the resulting impedance Z will inevitably change, as the only way to get through the film is by breaking the trace formed of (1), or remove the film from the electronic module (3).

A resulting characteristic of the detection circuit as described above is the ability to form a circuit of a non-fixed length. The sealing tape can be supplied on a roll and protecting an item would then involve a separate step of application of an electronic module and then sealing with the supplied inexpensive tape. As seen in FIG. $3a$, the seal is applied to the item to be protected by first applying one end ($1a$) of the tape to one patch ($2a$). The tape is then affixed and arranged on the product to enclose the parts to be protected. Finally, the tape is arranged to attach to the second patch ($2b$), where the tape is cut so a second end is formed ($1b$).

Another characteristic of the described embodiment is that the detection circuit (3) can be reused multiple times.

In a setup where a fixed-size seal is desirable, the electronic module could be made a part of the seal itself. The seal must then be mounted to have one end overlapping the other, thereby forming a closed capacitive loop.

Figure 5A:
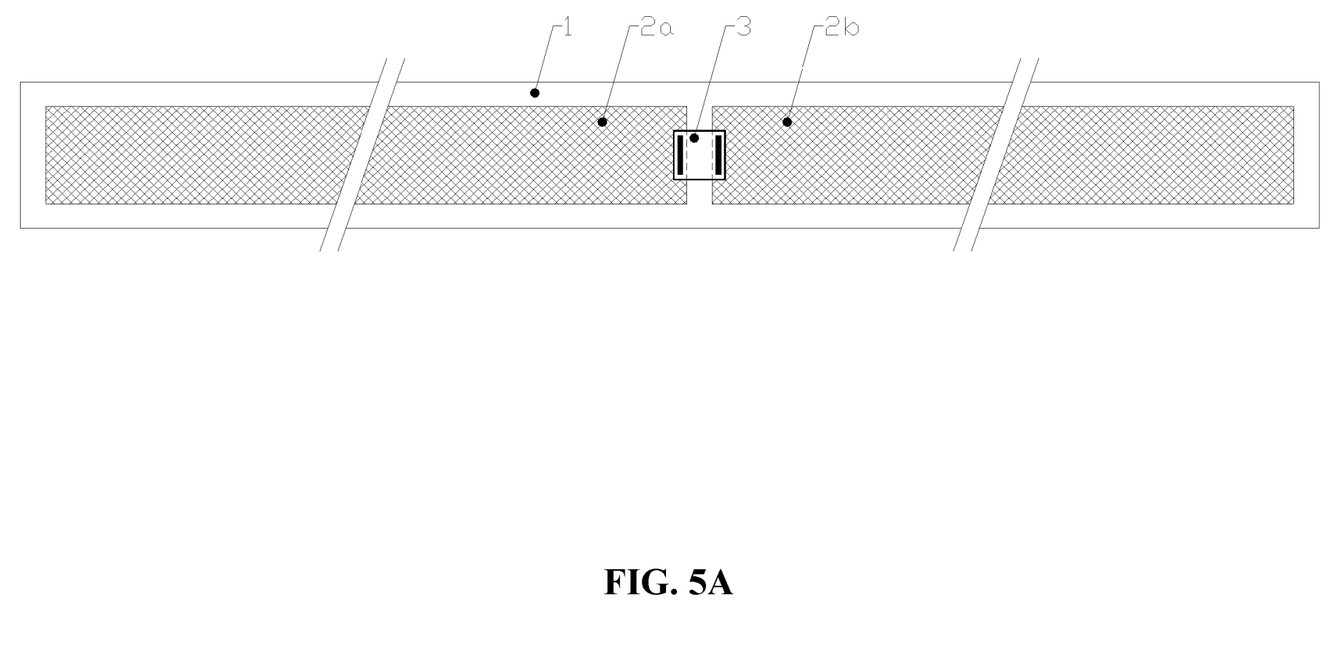
FIGS. 5A, 5B, and 5C illustrate another embodiment in different views.
Figure 5B:
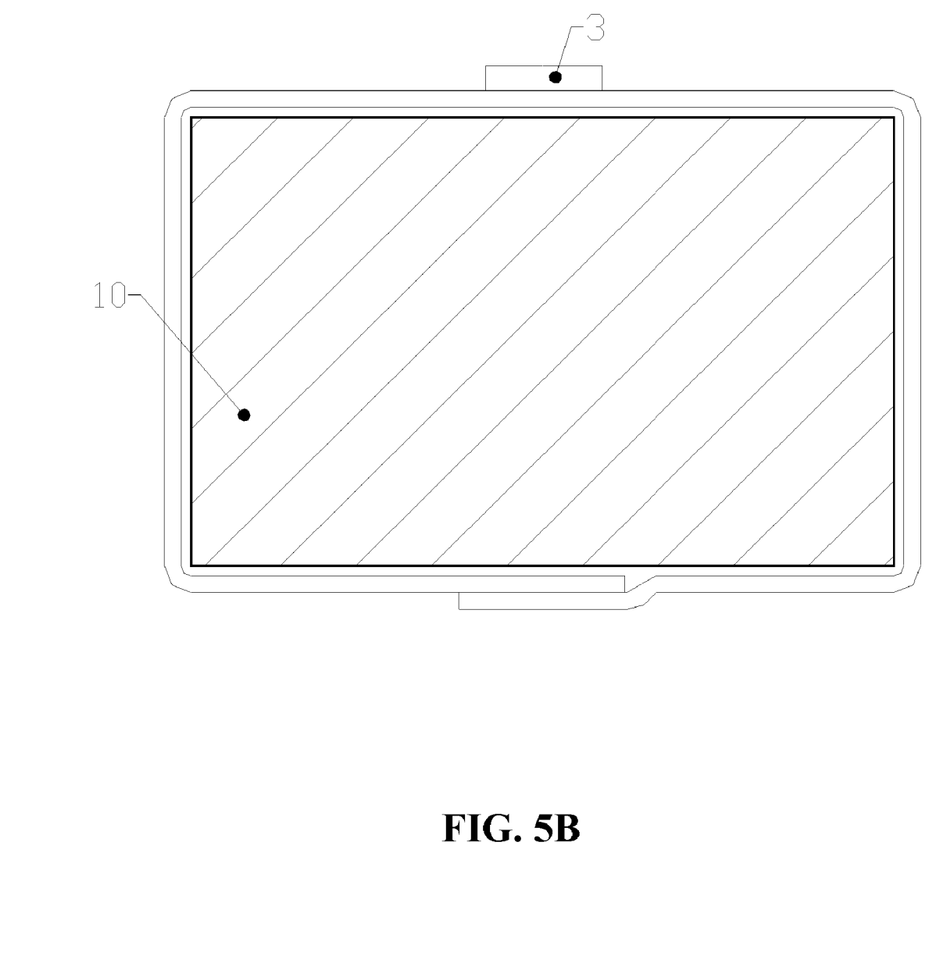
Figure 5C:
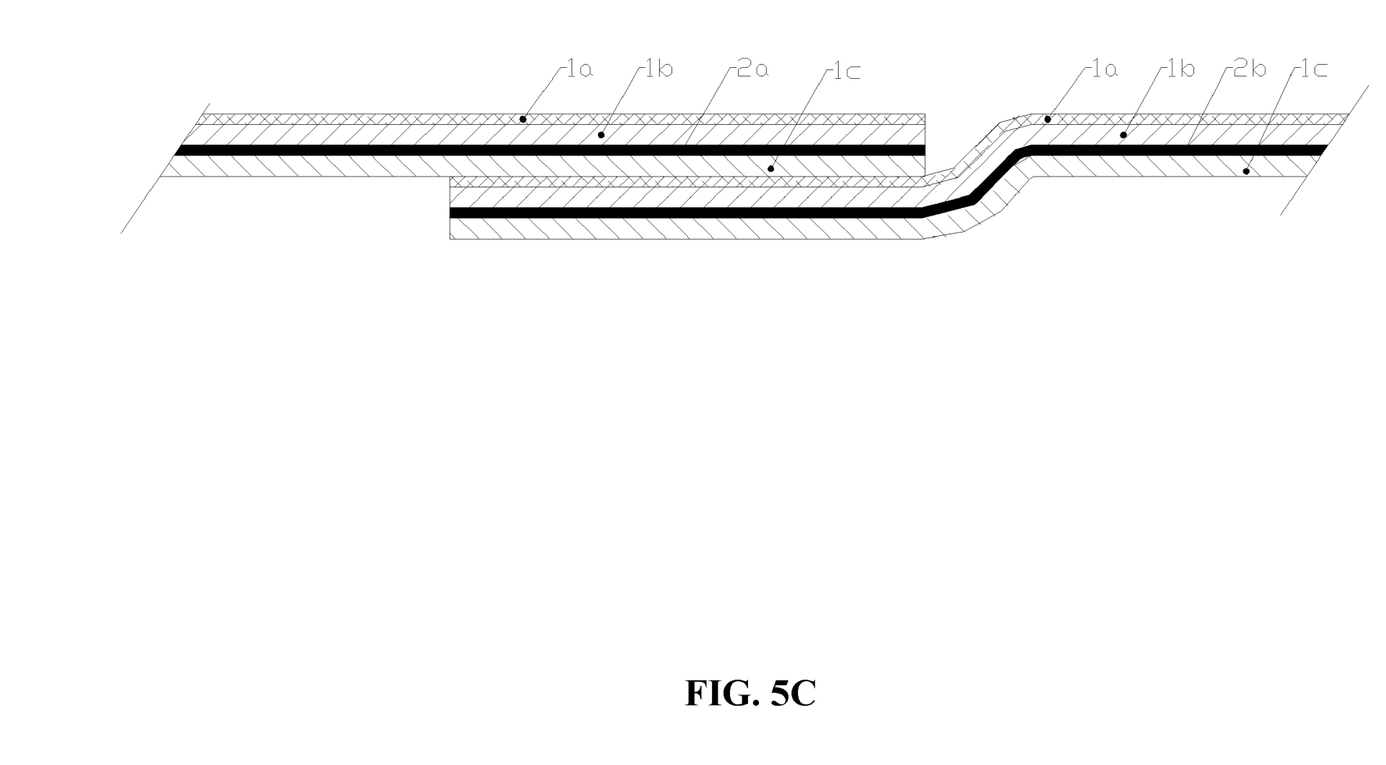

FIGS. 5A and 5B show an electronic module (3) made as an integral part of a seal tape (1). The seal is mounted to enclose an item (10), where the ends of the seal are applied to create an overlap, as seen in FIG. 5C. An AC current fed from the electronic module through an electrically conductive trace (2a), where a capacitive element is formed by the overlap. The AC current is coupled through the overlap and is sensed by the electronic module via a second conductive trace (2b). A tamper event will by this design result in an AC impedance change, which is detected by the electronic module (3).

The electronic module can also be used in a different setup, where the module is embedded into a self-adhesive label. The label can for example be a quality assurance label on an expensive- or critical item.

Figure 6:
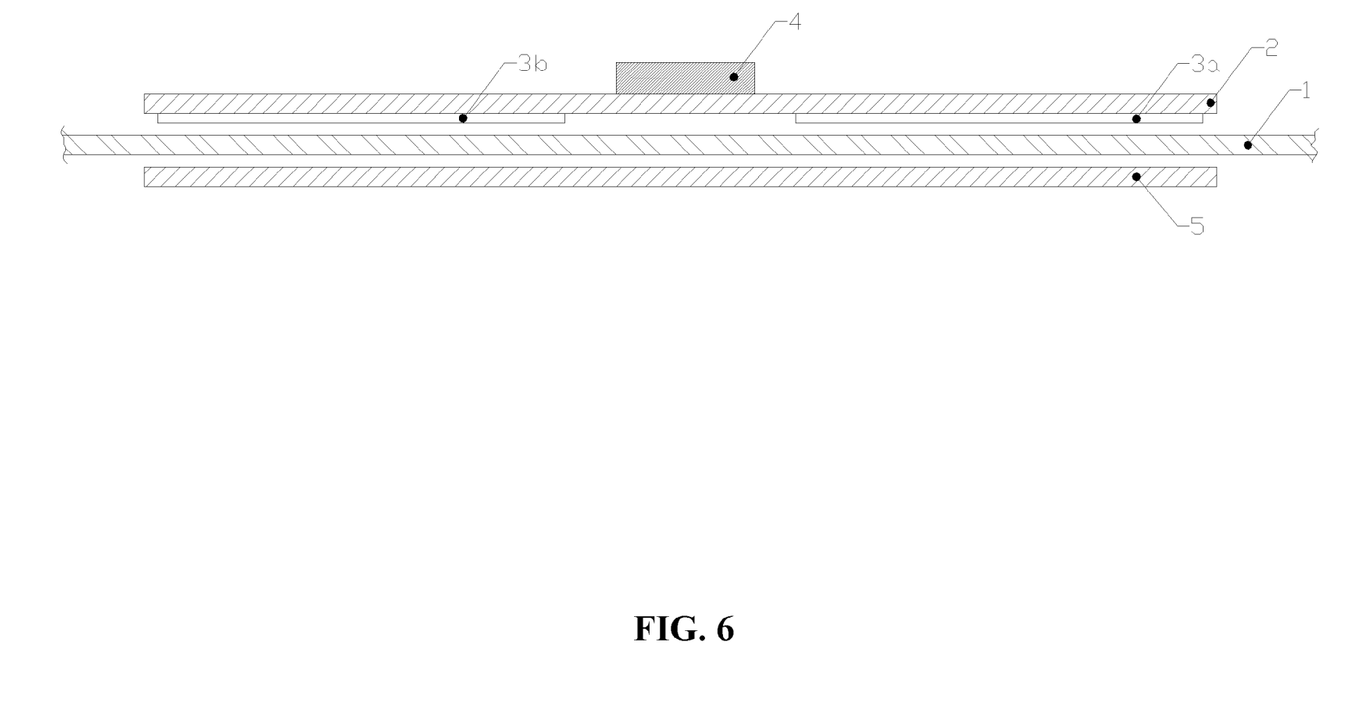
FIG. 6 illustrates another embodiment wherein a module is embedded in a self-adhesive label.

FIG. 6 shows a tape seal in the form of a label(2), which is applied onto a paper substrate (1), and on the opposite of the paper, another self adhesive label (5) is applied, having an electrically conductive area extending over its entire surface. As long as both labels are aligned on each side of the paper, a resulting capacitive element is formed between patches 3a-5 and 3b-5, where the paper substrate (1) acts as a dielectric. Any attempt to remove any of the labels, even partially, results in a change in impedance of the detection circuit, which then is interpreted as a tamper event by the processing unit (4).

It should be obvious that the above described embodiment can be implemented in several different varieties. For example, the opposite patch (5) may be formed as an electrically conductive pattern instead of a continuous surface, thereby yielding a larger resulting resistance.

Further, the electronic module (2) may have additional patches (3c and 3d, not shown). In such an arrangement, the opposite patch (5) may be divided in four fields, where the detection unit (4) can sense the impedance between four points instead of 2, i.e. 3a-3b, 3a-3c, 3a-3d, 3b-3c, 3b-3d, 3c-3d. This allows a more precise detection that the label has been placed on the right place. If the impedance paths 3a-3b-3c-3d are all different and arranged in a quadratic shape, the detection unit can further detect in which rotation the label has been applied, i.e. 0, 90, 180 or 270 degrees. Yet further, the substrate (1) may have different patch areas (5) on different locations. By having different impedance characteristics, the detection circuit (4) can sense which of these locations the module (2) has been affixed to.

This embodiment also allows the electronic module to be mounted inside the packaging of a product. By printing a target marker with non-conductive ink on the outside of the packaging, the position of the module can be located from the outside of the packaging. As a final stage when a product is packaged, a quality assurance label is then applied on the printed target mark. The benefit with this arrangement is that the label does not include electronics and can be made as thin as a standard label as the electrically conductive layer can be made a few micrometers thin.

The above described arrangement can by nature be swapped, where the conductive patch or patches are applied inside of a packaging and the sensing module is applied from the outside. However, this arrangement makes the module more susceptible to damage and destruction as it is exposed from the outside.

A slightly different approach would be to print the target marker using conductive ink. When the label is applied on the printed target mark, the capacitive loop is closed. As the ink is absorbed by the substrate of which is printed, it would be very difficult to remove the label without changing the capacitance in the loop.

By using the radio-telemetry interface of the electronic module, the module can then be programmed to start its monitoring of the label's integrity.

Below is a basic scheme to authenticate, and securely exchange information between a host computer (Host) in a computer network (Network), and a seal in accordance with an embodiment of this disclosure. The tape is not directly connected to the computer network but rather through a network-connected scanning terminal, preferably compatible with any of the evolving RFID infrastructures, such as ISO1 5693 or ISO1 8000-6/EPC generation 2, for example.

In order to simplify the description from a conceptual viewpoint, the details of the "proxy terminal" and interface is omitted in the following text describing a method for determining tampering with a sealed item:

1. The sealed item is placed in proximity to a RFID scanner
2. The device transmits its unique identity to the host in clear text. The host performs a search in a database to get the appropriate cryptographic key that is used for secure operations with the device.
3. The host issues a random number, which is transmitted to the device as a challenge.
4. The device encrypts the challenge, together with its unique identity and sends back the result as a response.
5. The host decrypts the received response and verifies that the result matches the issued challenge and the initial received identity. If the entities match, the device is considered to be authentic.
6. The host requests data from the device, and initiates Chained Block Cipher (CBC) encryption by sending an Initialization Vector (IV). The initialisation vector prevents attempts to replay previously transmitted data.
7. The device transmits data to the host, encrypted in CBC mode.
8. The first transmitted block includes a linear counter and a time reference, if applicable, to make two subsequent transmissions for the same data guaranteed different, thereby thwarting attacks involving comparing data.
9. The final block should be a known signature, such as the device identity padded with zeroes, allowing the host to detect that all data has been received successfully.
10. The host receives the data en decrypts it. The signature in the last block is verified to ensure that the received data was authentically received and without errors.
11. The host performs necessary operations on the data and returns a suitable completion message to the device.

Depending on security policy, step 4-6 may be considered redundant and therefore be omitted.

The security scheme above implements a powerful, yet simple method of ensuring the identity and authenticity of a product and its seal. Further, information exchanged with a host computer over a data network is protected from eavesdropping and modification.

This disclosure describes several embodiments, all having in common, in various ways, monitoring of complex impedance embedded in a continuous seal. The seal is designed in such a way, that any attempt to break or remove the seal results in a change of the complex impedance. An electronic module in connection with the seal circuitry and means for quantifying the complex impedance, and when a change is detected above a programmed threshold, treating such a change as a tamper event.

In an embodiment of this disclosure, the inclusion of reference impedances are applied to allow a more precise detection of a tamper event and allow for automatic calibration of natural variations of the complex impedance.

When the seal is properly applied, a reference measurement is performed on all impedances and these nominal values are stored in the memory of the electronic module.

The processing unit of the seal should preferably include a cryptographic processor to enable high-security active authentication. Together with a factory-programmed unique identity, at least one cryptographic key can be sent to the processing unit. The tamper evident seal can then be used in conjunction with a host computer via a computer network to actively authenticate a seal. Further, the cryptographic processor can be used to encrypt information being sent from the seal to prevent illegal eavesdropping of potentially sensitive information.

A tamper evident seal can generally be used in two different modes—active or passive. An active seal would include an integrated power source, which allows continuous impedance monitoring. Further, an active device enables time-stamping of tamper events, which allows not only detection of a tamper event, but also a time reference when it happened. Yet further, an active device can store recorded impedance values at a predefined interval in an internal memory to allow a more sophisticated investigation to be performed if there is a suspicion of tampering which may have been undetected by the preset threshold values.

In some applications it may not be feasible to integrate a power source, and the seal can then be configured as a passive device. "Passive" means that the unit does not have an on-board power source, and only receives power when being present to a radio-telemetry scanning device. A passive seal will be less exact, as impedances cannot be continuously monitored, where natural impedance fluctuations can be more accurately cancelled out. For a passive seal, accurate registration of the nominal impedance of each sensing line is more important. A more sophisticated opponent could otherwise potentially remove a label and then restore the conductivity of a broken trace. However, accurate impedance measurement and calibration to reference traces would make such an operation very difficult, as the nominal impedance is not known, nor the resulting impedance of a repaired circuit.

What is claimed as new and desired to be protected by Letters Patent of the United States is:

1. A tape seal for sealing an item and allowing for detection of tampering with the seal, the tape seal comprising:
    a substrate having an integral and electrically conductive circuit arrangement and a detection circuit, wherein said detection circuit monitors a complex impedance of said conductive circuit arrangement and, responsive to the monitored complex impedance, detects tampering with the tape seal;
    a radio telemetry interface operatively coupled to said electronic detection circuit so as to allow information to be exchanged between the tape seal and an external host computer system,
    wherein said conductive circuit arrangement comprises circuit lines of printed electrically conductive ink,
    wherein said substrate is selected from the group consisting of a polymer, a paper, and a combination thereof,
    wherein said electrically conductive circuit arrangement comprises at least one circuit line adapted and arranged so that tampering with the tape seal causes a change of resistance of said circuit line, wherein said change of resistance of said circuit line is recorded and stored by the detection circuit,
    wherein the at least one circuit line comprises a plurality of circuit lines extending over different lengths of the tape seal corresponding to associated visual markers on the tape seal where the tape seal may suitably be cut at the different lengths.

2. The tape seal of claim 1, wherein said electrically conductive circuit arrangement comprises at least one resistive circuit line in series with at least one capacitive circuit element,
    wherein a resulting complex impedance is monitored by the detection circuit and a change in the complex impedance is recorded as a tamper event by the detection circuit.

3. A tape seal for sealing an item and allowing for detection of tampering with the seal, the tape seal comprising:
    a substrate having an integral and electrically conductive circuit arrangement and a detection circuit, wherein said detection circuit monitors a complex impedance of said conductive circuit arrangement and, responsive to the monitored complex impedance, detects tampering with the tape seal;
    a radio telemetry interface operatively coupled to said electronic detection circuit so as to allow information to be exchanged between the tape seal and an external host computer system; and
    further comprising a pair of electrically conductive tape elements, each of said tape element having one end thereof connected to the detection circuit and the other end arranged so as to at least partially overlap the other tape element in the pair,
    wherein said conductive circuit arrangement comprises circuit lines of printed electrically conductive ink,
    wherein said electrically conductive circuit arrangement comprises at least one resistive circuit line in series with at least one capacitive circuit element,
    wherein a resulting complex impedance is monitored by the detection circuit and a change in the complex impedance is recorded as a tamper event by the detection circuit, and
    wherein said pair of electrically conductive tape elements are arranged by said overlap so as to form a capacitive circuit element when the tape seal is mounted on the item.

4. The tape seal of claim 3, wherein the detection circuit comprises an electronic module mounted on the item and connected to the conductive circuit arrangement, wherein the electronic module is mounted separately at least from the conductive circuit arrangement.

5. The tape seal of claim 4, wherein said electronic module is connected to the conductive circuit arrangement via a capacitive connection.

6. The tape seal of claim 1, wherein the conductive circuit arrangement comprises an electrically conductive film.

7. The tape seal of claim 1, further comprising a reference circuit adapted and arranged to calibrate the detection circuit to account for changes in a sensing circuit arrangement.

* * * * *